United States Patent
Wiechers et al.

(10) Patent No.: US 12,002,003 B2
(45) Date of Patent: Jun. 4, 2024

(54) METHOD AND APPARATUS FOR STIPULATING A DELIVERY AND/OR PICKUP POSITION

(71) Applicants: Ralph Wiechers, Mayschoß (DE); Matthias Busecke, Bonn (DE)

(72) Inventors: Ralph Wiechers, Mayschoß (DE); Matthias Busecke, Bonn (DE)

(73) Assignee: Deutsche Post AG, Bonn (DE)

( * ) Notice: Subject to any disclaimer, the term of this patent is extended or adjusted under 35 U.S.C. 154(b) by 327 days.

(21) Appl. No.: 17/220,327

(22) Filed: Apr. 1, 2021

(65) Prior Publication Data

US 2021/0224737 A1 Jul. 22, 2021

Related U.S. Application Data

(63) Continuation of application No. 15/160,096, filed on May 20, 2016, now abandoned.

(30) Foreign Application Priority Data

May 20, 2015 (DE) .......................... 102015108003.6

(51) Int. Cl.
G06Q 10/0836 (2023.01)
G06Q 10/083 (2023.01)

(52) U.S. Cl.
CPC ....... *G06Q 10/0836* (2013.01); *G06Q 10/083* (2013.01)

(58) Field of Classification Search
CPC .................................................. G06Q 10/836
See application file for complete search history.

(56) References Cited

U.S. PATENT DOCUMENTS

| | | | | |
|---|---|---|---|---|
| 2007/0257774 | A1* | 11/2007 | Stumpert | G06Q 10/08 340/7.1 |
| 2012/0320891 | A1* | 12/2012 | Moeller | H04W 4/021 370/338 |
| 2015/0032578 | A1* | 1/2015 | Bicer | H04L 63/18 705/26.82 |
| 2015/0120094 | A1* | 4/2015 | Kimchi | G06Q 10/083 701/3 |
| 2016/0071056 | A1* | 3/2016 | Ellison | G06Q 10/08355 705/338 |

FOREIGN PATENT DOCUMENTS

CN 103886441 A 6/2014

OTHER PUBLICATIONS

Adrienne Welch, A Cost-Benefit Analysis of Amazon Prime Air, Mar. 16, 2015, (Year: 2015).*

(Continued)

*Primary Examiner* — Resha Desai
*Assistant Examiner* — Ismail A Manejwala
(74) *Attorney, Agent, or Firm* — Reinhart Boerner Van Deuren P.C.

(57) ABSTRACT

The disclosure relates, inter alia, to a method comprising the steps of providing, by a user apparatus, an activable user interface for stipulating a delivery and/or pickup position, capturing of a position of the user apparatus when the user interface is activated, and communication of delivery and/or pickup position information associated with the captured position from the user apparatus to a delivery service apparatus.

5 Claims, 3 Drawing Sheets

(56) References Cited

OTHER PUBLICATIONS

Decision of the German Federal Supreme Court, May 24, 2004, 9 pages, Germany.
Decision of the German Federal Supreme Court, Oct. 17, 2001, 10 pages, Germany.
Decision of the German Federal Supreme Court, Oct. 19, 2004, 7 pages, Germany.
Decision of the German Federal Supreme Court, Feb. 24, 2011, 18 pages, Germany.
Decision of the German Federal Supreme Court, Oct. 26, 2010, 20 pages, Germany.
Decision of the German Federal Supreme Court, Jan. 20, 2009, 9 pages, Germany.
Decision of the German Federal Supreme Court, Oct. 19, 2004, 14 pages, Germany.
DHL, "For the first time in Germany: the car becomes a mobile delivery address for packages", Apr. 22, 2015, 4 pages (including Google Translate translation), Bonn, Germany.
Focus Online, "Packet Messenger Opens the Car; DHL, Audi and Amazon make your trunk to the packing station," Internet Article, Apr. 22, 2015, 13 pages.
David K. Gibson, "BBC—Autos—Audi, Amazon and DHL begin direct-to-car parcel dropoff," Internet Article, Apr. 24, 2015, 10 pages.
Sam Frizell, "Audi Wants to Deliver Amazon Packages to Your Car," Internet Article, Apr. 23, 2015, 1 page.

\* cited by examiner

METHOD AND APPARATUS FOR STIPULATING A DELIVERY AND/OR PICKUP POSITION

CROSS-REFERENCE TO RELATED PATENT APPLICATIONS

This patent application is a continuation of U.S. application Ser. No. 15/160,096, filed on May 20, 2016, which claims priority to German Application No. 10 2015 108 003.6, filed May 20, 2015, the entire teachings and disclosure of both applications are incorporated herein by reference thereto.

FIELD

Exemplary embodiments of the invention relate to a method for stipulating a delivery and/or pickup position, methods for communicating a delivery and/or pickup position, a computer program, a user apparatus, a delivery service apparatus and a system.

BACKGROUND

The delivery of a shipment to a mobile shipment holding apparatus by depositing the shipment in the shipment holding apparatus is a form of delivery that is very convenient for the shipment recipient, since the shipment recipient does not have to receive the shipment in person. An example of a mobile shipment holding apparatus is a vehicle of the shipment recipient. By way of example, the shipment can be delivered into the vehicle of the shipment recipient while it is parked in a company car park during the working hours of the shipment recipient. However, the delivery agent needs to be notified of the delivery position of the vehicle in advance. This significantly restricts the flexibility and convenience of this form of delivery, since the shipment recipient is tied to the delivery position for which advance notification has been provided and cannot park the vehicle in a different position.

SUMMARY OF A FEW EXEMPLARY EMBODIMENTS OF THE INVENTION

The present invention has therefore taken on the task, inter alia, of overcoming these problems.

According to the invention, a first method is disclosed, said first method comprising:
  providing, by a user apparatus, an activable user interface for stipulating a delivery and/or pickup position,
  capturing a position of the user apparatus when the user interface is activated, and
  communicating delivery and/or pickup position information associated with the captured position from the user apparatus to a delivery service apparatus.

For example, the first method is a method for stipulating a delivery and/or pickup position, for example a method for stipulating a delivery position for delivery of a shipment (e.g. to a mobile shipment holding apparatus such as a vehicle) and/or for stipulating a pickup position for pickup of a shipment (e.g. from a mobile shipment holding apparatus such as a vehicle). For example, the first method is performed at least in part by the user apparatus and/or by respective means of the user apparatus.

According to the invention, a user apparatus is disclosed that comprises the following:
  means configured to perform and/or control the first method or respective means for performing and/or controlling the steps of the first method (e.g. all steps that are not performed by a user).

For example, the means of the user apparatus according to the invention are configured to perform and/or to control the first method or the steps thereof (e.g. apart from the steps that are performed by a user). One or more of the steps of the first method can also be performed and/or controlled by the same means. By way of example, one or more of the means of the user apparatus may be formed at least in part by one or more processors.

For example, the user apparatus according to the invention comprises at least one processor and at least one memory that contains program code, wherein the memory and the program code are configured to cause the user apparatus having the at least one processor to perform and/or to control at least the first method. In this case, either all steps of the first method can be controlled or all steps of the first method can be performed, or one or more steps are controlled and one or more steps are performed.

By way of example, a processor is intended to be understood to mean a control unit, a microprocessor, a microcontrol unit such as a microcontroller, a digital signal processor (DSP), an application-specific integrated circuit (ASIC) or a field-programmable gate array (FPGA).

For example, the user apparatus according to the invention is a portable user apparatus. For example, the user apparatus according to the invention is a user appliance such as a mobile telephone, a personal digital assistant (PDA), a media player (e.g. an iPod), a navigation appliance (e.g. a navigation appliance for a vehicle, e.g. a permanently installed navigation appliance of a vehicle or a portable navigation appliance), a notebook computer and/or a tablet computer.

According to the invention, a second method is additionally disclosed, said second method comprising:
  obtaining delivery and/or pickup position information from a user apparatus at a delivery service apparatus,
  associating, by the delivery service apparatus, the obtained delivery and/or pickup position information with a delivery agent apparatus,
  communicating the obtained delivery and/or pickup position information from the delivery service apparatus to the delivery agent apparatus.

For example, the second method is a method for communicating a delivery and/or pickup position, for example a method for communicating a delivery position for delivery of a shipment (e.g. to a mobile shipment holding apparatus such as a vehicle) and/or for stipulating a pickup position for pickup of a shipment (e.g. from a mobile shipment holding apparatus such as a vehicle), to a delivery agent apparatus. For example, the second method is performed at least in part by the delivery service apparatus and/or by respective means of the delivery service apparatus.

According to the invention, a delivery service apparatus is disclosed that comprises the following:
  means configured to perform and/or control the second method or respective means for performing and/or controlling the steps of the second method (e.g. all steps that are not performed by a user).

For example, the means of the delivery service apparatus according to the invention are configured to perform and/or to control the second method or the steps thereof (e.g. apart from the steps that are performed by a user). One or more of the steps of the second method can also be performed and/or controlled by the same means. By way of example, one or more of the means of the user apparatus may be formed at least in part by one or more processors.

For example, the delivery service apparatus according to the invention comprises at least one processor and at least one memory that contains program code, wherein the memory and the program code are configured to cause the delivery service apparatus having the at least one processor to perform and/or to control at least the second method. In this case, either all steps of the second method can be controlled or all steps of the second method can be performed, or one or more steps are controlled and one or more steps are performed.

As disclosed above, a processor is intended to be understood to mean, by way of example, a control unit, a microprocessor, a microcontrol unit such as a microcontroller, a DSP, an ASIC or an FPGA.

For example, the delivery service apparatus according to the invention is a server of a delivery service, for example a backend server of the delivery service.

According to the invention, a third method is additionally disclosed, said third method comprising:
the first method and/or the steps of the first method, and the second method and/or the steps of the second method.

For example, the third method is performed and/or controlled at least in part by the user apparatus and/or by respective means of the user apparatus and also by the delivery service apparatus and/or by respective means of the delivery service apparatus.

According to the invention, a system is disclosed that comprises the following:
one or more user apparatuses according to the invention, and
one or more delivery service apparatuses according to the invention.

According to the invention, a computer program is disclosed that comprises the following: program instructions that cause a processor to perform and/or control the first, the second and/or the third method when the computer program runs on the processor.

By way of example, the computer program according to the invention is an application program for a user apparatus, for example an application program for a mobile telephone such as an app.

By way of example, the computer program according to the invention may be distributable over a network, such as the Internet, a telephone or mobile radio network and/or a local area network. The computer program according to the invention may be at least in part software and/or firmware of a processor. It may equally be implemented at least in part as hardware. By way of example, the computer program according to the invention may be stored on a computer-readable storage medium, e.g. a touchable, magnetic, electrical, electromagnetic, optical and/or other kind of storage medium. By way of example, the storage medium may be part of the processor, for example a (nonvolatile or volatile) program memory and/or main memory of the processor or a portion thereof.

The properties of the method according to the invention, of the user apparatus according to the invention, of the delivery service apparatus according to the invention, of the system according to the invention and of the computer program according to the invention are described—in part by way of example—below.

By way of example, an activable user interface is intended to be understood to mean an element of a user interface of the user apparatus that is activable by a user input that is able to be captured by input means of the user apparatus. By way of example, the activable user interface is provided according to the first method by the activable user interface being rendered activable such that the activable user interface is activable by a user input that is able to be captured by input means of the user apparatus. For example, the user apparatus comprises one or more appropriate provision means and/or one or more input means. By way of example, the provision means of the user apparatus are configured to provide the activable user interface, and the input means of the user apparatus are configured to capture a user input for activating the provided activable user interface.

For example, the activable user interface is an activable element of a graphical user interface, for example a button such as a key button. Such an element of a graphical user interface is provided by display on a display means of the user apparatus, for example. An element of a graphical user interface, which element is displayed on a display means, can be provided, by way of example, by an input on a suitable input means such as a mouse, a trackball, a joystick, a touchpad and/or a keypad. An element of a graphical user interface, which element is displayed on a touch-sensitive display means such as a touch-sensitive screen (e.g. a touchscreen), can also be activated, by way of example, by a touch on the display means. For example, the user apparatus comprises one or more appropriately set-up display means.

By way of example, the capturing of a position of the user apparatus according to the first method when the activable user interface is activated is intended to be understood to mean that the present position of the user apparatus is captured as closely as possible to before, during and/or after the activation of the activable user interface. For example, the position of the user apparatus can be captured immediately after the activation of the activable user interface, so that the result of the capturing is the present position of the user apparatus. If the present position of the user apparatus is not able to be captured, it is instead possible for, by way of example, the result of the capturing to be the most recently captured position (i.e. the last position captured before the activation of the activable user interface). The intention of this is to capture as far as possible the position of the user apparatus at which the user apparatus is situated for the activation of the activable user interface, so that the user can use the position at which the activable user interface is activated by the user to stipulate a delivery and/or pick up position.

The position of the user apparatus that is captured according to the first method is a spatial and/or geographical position of the user apparatus, for example. The position of the user apparatus is captured by one or more positioning means of the user apparatus, for example, such as a positioning sensor. An example of such a positioning sensor is a sensor of a satellite-assisted positioning system such as a Global Positioning System sensor (GPS sensor), a GLONASS sensor and/or a Galileo sensor.

By way of example, a delivery and/or pickup position is intended to be understood to mean a position at which or in proximity to which delivery of a shipment (e.g. to a mobile shipment holding apparatus such as a vehicle) and/or pickup of a shipment (e.g. from a mobile shipment holding apparatus such as a vehicle) is intended to take place. By way of example, delivery and/or pickup position information comprises a position statement and/or coordinate statement for a delivery and/or pickup position. In addition, delivery and/or pickup position information comprises, by way of example, an identifier that is associable with the delivery and/or pickup of the shipment, for example an identifier for the shipment, for the recipient/sender of the shipment, for a user of the user apparatus and/or for a mobile shipment holding apparatus (e.g. a vehicle) to which the delivery and/or from which the pickup is intended to be made.

By way of example, the delivery and/or pickup position information is intended to be understood as being associated with the position captured according to the first method if it comprises a position statement and/or coordinate statement for the captured position. By way of example, the delivery and/or pickup position information comprises a position statement and/or coordinate statement for the position of the user apparatus that is captured according to the first method, for example a position of the user apparatus that is captured as closely as possible to before, during and/or after the activation of the activable user interface. A user can therefore use the activation of the activable user interface in order to stipulate a delivery and/or pickup position, i.e. a position at which or in proximity to which delivery of a shipment (e.g. to a mobile shipment holding apparatus such as a vehicle) or pickup of a shipment (e.g. from a mobile shipment holding apparatus such as a vehicle) is intended to take place. The invention is therefore advantageous particularly in connection with the delivery of a shipment to a mobile shipment holding apparatus and the pickup of a shipment from a mobile shipment holding apparatus.

A mobile shipment holding apparatus is preferably intended to be understood to mean any non-stationary apparatus that can hold a shipment in a sealable interior. An example of a mobile shipment holding apparatus is a vehicle (e.g. a motor vehicle such as a heavy goods vehicle or a car, particularly preferably a car, e.g. an automobile) and/or a mobile letterbox and/or package box (e.g. what is known as a package butler). The user apparatus may be part of the shipment holding apparatus (e.g. as a navigation appliance of a vehicle). Alternatively, the user apparatus is separate from the shipment holding apparatus (e.g. as a mobile telephone), so that a particularly high degree of flexibility is possible (e.g. a user can use the user apparatus for stipulating the delivery and/or pickup position in connection with various shipment holding apparatuses).

According to the first method, the delivery and/or pickup position information is communicated from the user apparatus to the delivery service apparatus, for example via a communication link, for example is sent from the user apparatus to the delivery service apparatus via a communication link. For example, the user apparatus comprises one or more appropriate communication means. By way of example, the communication means of the user apparatus are configured to use a communication link to communicate with a delivery service apparatus and to send and/or to receive information. An example of such a communication means is a communication interface. For example, the communication means of the user apparatus comprise a communication interface for a wireless and/or wired communication technology.

By way of example, the obtainment of the delivery and/or pickup position information from the user apparatus at the delivery service apparatus according to the second method is intended to be understood to mean that the delivery and/or pickup position is received from the user apparatus at the delivery service apparatus via a communication link. For example, the delivery service apparatus comprises one or more appropriate communication means. By way of example, the communication means of the delivery service apparatus are configured to use a communication link to communicate with a user apparatus and to send and/or to receive information. An example of such a communication means is a communication interface. For example, the communication means of the delivery service apparatus comprise a communication interface for a wireless and/or wired communication technology.

According to the second method, the obtained delivery and/or pickup position information is associated with the delivery agent apparatus, for example at least in part on the basis of an identifier that the delivery and/or pickup position information comprises. For example, the delivery and/or pickup position information is associated with the delivery agent apparatus of the delivery agent who is intended to deliver the shipment (e.g. to a mobile shipment holding apparatus such as a vehicle).

According to the second method, the delivery and/or pickup position information is additionally communicated from the delivery service apparatus to the delivery agent apparatus, for example via a communication link, for example is sent from the delivery service apparatus to the delivery agent apparatus via a communication link. By way of example, the communication means of the delivery service apparatus are configured to use a communication link to communicate with a delivery agent apparatus and to send and/or to receive information. As disclosed above, an example of such a communication means is a communication interface. For example, the communication means of the delivery service apparatus comprise a communication interface for a wireless and/or wired communication technology.

By way of example, the delivery agent apparatus is a portable electronic appliance and/or a portable electronic unit. By way of example, the delivery agent apparatus is configured to communicate with the delivery service apparatus according to the invention. For example, the delivery agent apparatus can comprise appropriate communication means. An example of a delivery agent apparatus is a user appliance, for example, such as a mobile telephone, a personal digital assistant (PDA), a media player (e.g. an iPod) and/or a navigation appliance. A further example of a delivery agent apparatus is, for example, a delivery agent appliance of a delivery service, such as a hand-held scanner, for example the Dolphin 99EX mobile computer from the company Honeywell. A further example of a delivery agent apparatus is, for example, a "tag" such as an RFID or NFC tag, for example a MiFARE DESFire from NXP.

For example, a communication link between the user apparatus and the delivery service apparatus comprises a communication link according to a wireless communication technology. By way of example, a communication link between the delivery service apparatus and the delivery agent apparatus comprises a further communication link according to a wireless communication technology. An example of a wireless communication technology is a local radio network technology such as radio frequency identification (RFID) and/or near field communication (NFC) and/or Bluetooth (e.g. Bluetooth version 2.1 and/or 4.0) and/or wireless local area network (WLAN). By way of example, RFID and NFC are specified according to ISO standards 18000, 11784/11785 and ISO/IEC standard 14443-A and 15693. The Bluetooth specifications are currently available on the Internet at www.bluetooth.org. For example, WLAN is specified in the standards of the IEEE 802.11 family. A further example of a wireless communication technology is a regional radio network technology, such as a mobile radio technology, for example Global System for Mobile Communications (GSM) and/or Universal Mobile Telecommunications System (UMTS) and/or Long Term Evolution (LTE), for example. The GSM, UMTS and LTE specifications are maintained and developed by the 3rd Generation Partnership Project (3GPP) and are currently available on the Internet at www.3gpp.com, inter alia.

As disclosed above, the invention is advantageous particularly in connection with the delivery of a shipment to a mobile shipment holding apparatus and the pickup of a shipment from a mobile shipment holding apparatus and significantly increases the flexibility and convenience of this form of delivery for the user. The reason is that the invention provides the user with the opportunity to stipulate a delivery and/or pickup position in a simple and uncomplicated manner as soon as he is situated, with the user apparatus, at or in proximity to the desired delivery and/or pickup position. At the same time, the invention ensures that the delivery agent is provided with all necessary information via the delivery agent apparatus in automated fashion.

Further advantages of the disclosed invention are described below on the basis of exemplary embodiments of the methods according to the invention, the user apparatus according to the invention, the delivery service apparatus according to the invention, the system according to the invention and the computer program according to the invention, the disclosure of which is intended to apply to the respective categories (method, apparatus, system, computer program) in equal measure.

According to one exemplary embodiment of the invention, the activable user interface is an activable element of a user interface of the user apparatus. As disclosed above, the activable user interface is an activable element of a graphical user interface, for example. Such an element of a graphical user interface is provided by display on a display means of the user apparatus, for example. An activable element of a graphical user interface, which element is displayed on a display means, is activable, by way of example, by an input by a user on a suitable input means such as a mouse, a trackball, a joystick, a touchpad and/or a keypad. An element of a graphical user interface, which element is displayed on a touch-sensitive display means such as a touch-sensitive screen (e.g. a touchscreen), is also activable, by way of example, by a touch on the display means.

According to one exemplary embodiment of the invention, the activable user interface comprises a button, particularly a key button. A button is an activable element of a graphical user interface, for example. Such an element of a graphical user interface is provided by display on a display means of the user apparatus, for example. By way of example, a key button is activable by "clicking" on the key button using a suitable input means.

According to one exemplary embodiment of the invention, the activable user interface is activable by a user input. As disclosed above, the activable user interface is activable by an input by a user on a suitable input means, for example. Preferably, the activable user interface is activable by as few user inputs as possible, particularly preferably by a single user input (e.g. by a single "click" on a button), so that a user of the user apparatus can cause the capturing of the position and the communication of the delivery and/or pickup position information associated with the captured position, according to the first method, in a particularly uncomplicated and simple manner. By way of example, this is advantageous in order to make the stipulation of a delivery and/or pickup position as uncomplicated and simple for the user as possible.

According to one exemplary embodiment of the invention, the first method additionally comprises the following:
providing, by the user apparatus, a further user interface for stipulating a delivery and/or pickup period,
obtaining delivery and/or pickup period information by the further user interface at the user apparatus, and
communicating the obtained delivery and/or pickup period information from the user apparatus to the delivery service apparatus.

For example, the first method is a method for stipulating a delivery position and a delivery period for delivery of a shipment (e.g. to a mobile shipment holding apparatus such as a vehicle) and/or for stipulating a pickup position and a pickup period for pickup of a shipment (e.g. from a mobile shipment holding apparatus such as a vehicle).

In addition, the second method according to this exemplary embodiment of the invention comprises the following:
obtaining delivery and/or pickup period information from the user apparatus at the delivery service apparatus, and
communicating the delivery and/or pickup position information to the delivery agent apparatus.

By way of example, the further user interface is a user input element. For example, the further user interface is a user input element of a user interface of the user apparatus. For example, the further user interface is a user input element of a graphical user interface. Such a user input element of a graphical user interface is provided by display on a display means of the user apparatus, for example.

By way of example, a user input element is intended to be understood to mean an element of a graphical user interface that is used for the recording of information by the user, such as an input panel and/or a selection element. Such an element of a graphical user interface is provided by display on a display means of the user apparatus, for example. By way of example, the further user interface comprises an input panel and/or a selection element, for example an input panel and/or a selection element of a graphical user interface.

An input panel allows a user to use a suitable input means, for example, such as a keypad, to input text information (e.g. letters and/or numbers such as start and end times and/or period information). The selection of one or more selection options for a selection element using a suitable input means (e.g. a mouse, a trackball, a joystick, a touchpad, a keypad and/or a touch-sensitive screen) allows a user to input (e.g. to select by "clicking on" and/or "manipulating" the respective selection options) selection information (e.g. start and end times and/or period information), for example.

The obtainment of delivery and/or pickup period information by the further user interface at the user apparatus according to the first method is effected by the capturing of an appropriate user input by a suitable input means of the user apparatus, for example. For example, by the capturing of an input of text into an input panel using a keypad and/or the capturing of the selection of one or more selection options for a selection element by a mouse, a trackball, a joystick, a touchpad, a keypad and/or a touch-sensitive screen.

According to the first method, the delivery and/or pickup period information is communicated from the user apparatus to the delivery service apparatus, for example via a communication link, for example is sent from the user apparatus to the delivery service apparatus via a communication link. For example, the delivery and/or pickup period information is communicated from the user apparatus to the delivery service apparatus together with the delivery and/or pickup position information and/or via the same communication link as the delivery and/or pickup position information. As disclosed above, the user apparatus comprises one or more appropriate communication means, for example.

By way of example, the obtainment of the delivery and/or pickup period information from the user apparatus at the delivery service apparatus according to the second method is intended to be understood to mean that the delivery and/or pickup period information is received from the user apparatus at the delivery service apparatus via a communication link. For example, the delivery and/or pickup period information is obtained from the user apparatus at the delivery service apparatus together with the delivery and/or pickup position information and/or via the same communication link as the delivery and/or pickup position information. As disclosed above, the delivery service apparatus comprises one or more appropriate communication means, for example.

According to the second method, the delivery and/or pickup period information is additionally communicated from the delivery service apparatus to the delivery agent apparatus, for example via a communication link, for example is sent from the delivery service apparatus to the delivery agent apparatus via a communication link. For example, the delivery and/or pickup period information is communicated from the delivery service apparatus to the delivery agent apparatus together with the delivery and/or pickup position information and/or via the same communication link as the delivery and/or pickup position information.

For example, the delivery and/or pickup period information is associated with a delivery and/or pickup period (e.g. a start time and an end time) for delivery and/or pickup of a shipment (e.g. to and/or from a mobile shipment holding apparatus such as a vehicle), for example the delivery and/or pickup period information indicates a delivery and/or pickup period (e.g. a start time and an end time) for delivery and/or pickup of the shipment (e.g. to and/or from a mobile shipment holding apparatus such as a vehicle). A user can therefore also stipulate a delivery period, i.e. a period in which delivery of a shipment (e.g. into a vehicle) is intended to take place, besides a delivery and/or pickup position, i.e. a position at which or in proximity to which delivery and/or pickup of a shipment is intended to take place, by an input using the further user interface.

This exemplary embodiment of the invention is therefore advantageous, by way of example, in order to increase the convenience and flexibility of the delivery of a shipment to a mobile shipment holding apparatus and of the pickup of a shipment from a mobile shipment holding apparatus for the user.

According to one exemplary embodiment of the invention, the second method additionally comprises the following:
  generating and/or selecting access authorisation information at least in part on the basis of the obtained delivery and/or pickup position information and/or the obtained delivery and/or pickup period information,
  communicating the produced and/or selected access authorisation information to the delivery agent apparatus.

For example, the access authorisation information has a limited temporal and/or spatial validity. For example, the access authorisation information is valid for a limited number of accesses, for example just for a single access (e.g. to a particular shipment holding apparatus such as a particular vehicle).

The access authorisation information includes one or more access authorisation parameters, for example. This or these may be, by way of example, an (in particular explicit) identifier for an access authorisation checking apparatus (e.g. an access authorisation checking apparatus of a shipment holding apparatus such as a vehicle), an (in particular explicit) identifier for the access authorisation information itself, temporal validity information (e.g. in the form of a "Not Before date", a "Not After date", a "start time for the day" and an "end time for the day", which indicate on what days and at what time of day access can be granted for the delivery, for example from 27.3.2014 00:00:00 hours to 28.3.2014 23:59:59 hours), a spatial validity information (e.g. in the form of a radius around a delivery coordinate and/or delivery and/or pickup position within which access can be granted), an upper limit for the permitted uses of the access authorisation information in order to gain access, and an information concerning the extent to which access can be granted (that is to say, by way of example, whether all doors of a shipment holding apparatus such as a vehicle can be opened, or just one or a particular group).

By way of example, the temporal validity information defines a delivery and/or pickup period in which the access authorisation information is valid and authorises access (e.g. to a shipment holding apparatus such as a vehicle). By way of example, the physical validity information defines a delivery and/or pickup position and/or a delivery and/or pickup area (e.g. a radius around a delivery and/or pickup position) in which the access authorisation information is valid and authorises access (e.g. to a shipment holding apparatus such as a vehicle). This is advantageous, by way of example, in order to increase security and, by way of example, to provide the user with the opportunity to limit access to the shipment holding apparatus (e.g. to a vehicle) for the delivery agent in terms of time and/or space.

By way of example, generation and/or selection of access authorisation information at least in part on the basis of the obtained delivery and/or pickup position information and/or the obtained delivery and/or pickup period information is intended to be understood to mean that the access authorisation information is produced and/or selected such that the access authorisation information is valid at the delivery and/or pickup position associated with the delivery and/or pickup position information and/or within the period associated with the delivery and/or pickup period information. For example, the delivery and/or pickup position associated with the delivery and/or pickup position information is situated within a delivery and/or pickup area defined by the spatial validity information of the access authorisation information. For example, the delivery and/or pickup period associated with the delivery and/or pickup period information corresponds to the delivery and/or pickup period defined by the temporal validity information of the access authorisation information.

According to the second method, the access authorisation information is additionally communicated from the delivery service apparatus to the delivery agent apparatus, for example via a communication link, for example is sent from the delivery service apparatus to the delivery agent apparatus via a communication link. For example, the access authorisation information is communicated from the delivery service apparatus to the delivery agent apparatus together with the delivery and/or pickup position information and/or via the same communication link as the delivery and/or pickup position information.

By way of example, the access authorisation information authorises access for delivery of a shipment to a shipment holding apparatus such as a vehicle. For example, the access authorisation information authorises exclusively access for delivery of a shipment to a shipment holding apparatus. For example, access authorisation checking means of a shipment holding apparatus check whether the access authorisation information authorises access before access to the vehicle is granted. For example, at least one predefined set (e.g. all, or just some) of the access authorisation parameters disclosed above have respective reference information (e.g. present time of day and/or present position of the shipment holding apparatus) checked to determine whether they each authorise access.

According to one exemplary embodiment of the invention, the second method additionally comprises the following:

providing the computer program comprising program instructions that cause a processor to perform and/or control the first method when the computer program runs on the processor, for the purpose of obtainment at the user apparatus.

By way of example, providing the computer program for the purpose of obtainment at the user apparatus is intended to be understood to mean that the computer program is provided such that the user apparatus can obtain the computer program via a communication link, for example can download it via a communication link. For example, the computer program can be provided by the computer program being rendered available for download via the Internet for the purpose of obtainment by the user apparatus. For example, the computer program is rendered available for download via the Internet by the storage and/or upload of the computer program on/to a file-hosting and/or file-sharing platform on the Internet (e.g. Dropbox) and/or on/to an app shop platform on the Internet (e.g. App Store (iOS), Windows Phone Store or Google Play).

According to one exemplary embodiment of the invention, the delivery and/or pickup position information and/or the delivery and/or pickup period information is based at least in part on a user input by a user at the user apparatus (e.g. a user input captured by input means of the user apparatus).

Further advantageous exemplary refinements of the invention can be found in the detailed description that follows for a few exemplary embodiments of the present invention, particularly in conjunction with the figures. The figures accompanying the application are intended to be used only for the purpose of clarification, however, rather than for determining the scope of protection of the invention. The accompanying drawings are not necessarily to scale and are intended merely to reflect the general concept of the present invention by way of example. In particular, features included in the figures are in no way intended to be regarded as a necessary part of the present invention.

DETAILED DESCRIPTION OF THE INVENTION

Figure 1:
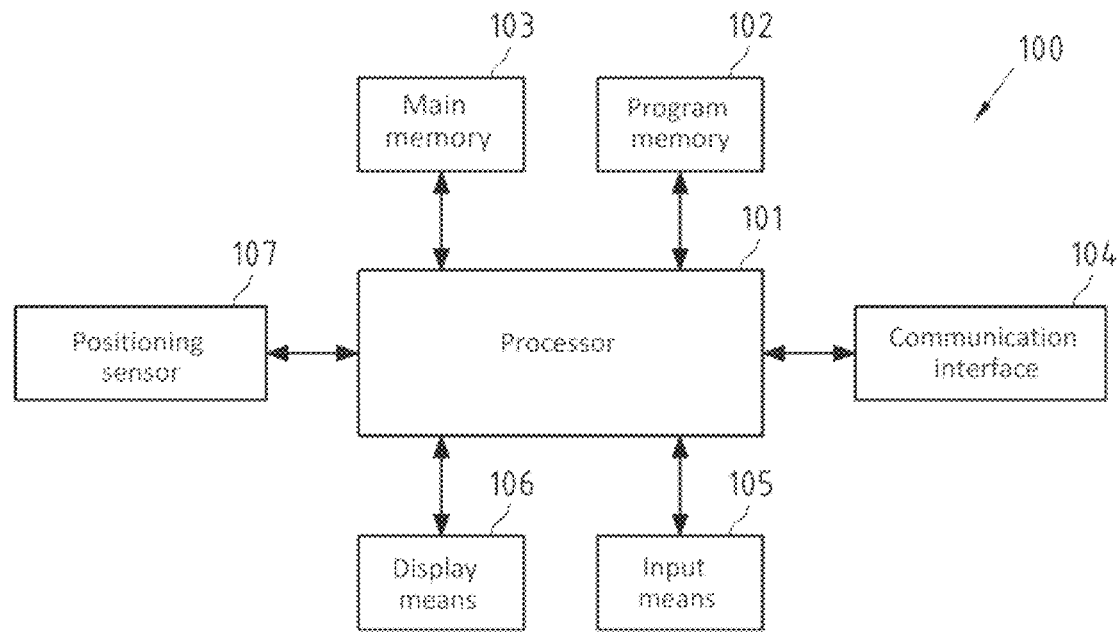
FIG. 1 shows a block diagram of the electronic components of an exemplary embodiment of a user apparatus according to the invention.

FIG. 1 is a block diagram of an exemplary embodiment of the user apparatus 100 according to the invention.

Processor 101 of the user apparatus 100 is particularly in the form of a microcontroller or microprocessor. Processor 101 executes program instructions that are stored in program memory 102, and stores interim results or the like in main memory 103, for example. For example, program memory 102 is a nonvolatile memory such as a flash memory, a magnetic memory, an EEPROM memory, a persistent memory such as a ROM memory and/or an optical memory. Main memory 103 is a volatile or nonvolatile memory, for example, particularly a random access memory (RAM) such as a static RAM memory (SRAM), a dynamic RAM memory (DRAM), a ferroelectric RAM memory (FeRAM) and/or a magnetic RAM memory (MRAM).

Preferably, program memory 102 and main memory 103 are arranged together with processor 101 in one module.

Figure 5:
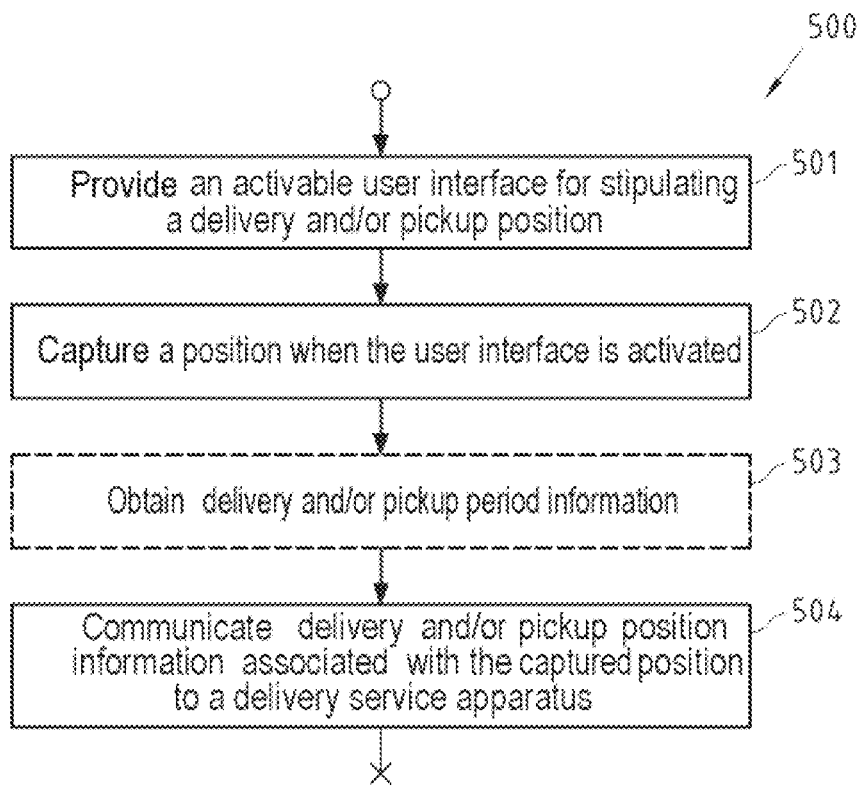
FIG. 5 shows a flowchart for an example of the first method according to the invention.

By way of example, program memory 102 stores program instructions that cause the processor 101, when it executes the program instructions, to perform and/or to control the method shown in FIG. 5 at least in part.

For example, the wireless communication interface 104 is configured to communicate according to one or more wireless communication technologies. It is assumed by way of example below that the wireless communication interface 104 supports communication via a mobile radio network. For example, the wireless communication interface 104 is formed at least in part by a transceiver for the mobile radio technology and one or more antennas. As disclosed above, an example of a mobile radio technology is GSM, UMTS and/or LTE.

By way of example, the processor 101 can communicate with other apparatuses such as a delivery service apparatus (e.g. the delivery service apparatus 200 in FIG. 3) via the wireless communication interface 104. By way of example, processor 101 is operatively connected to the wireless communication interface 104. By way of example, the wireless communication interface 104 can receive or request information from other apparatuses and forward said information to processor 101 and/or can receive information from processor 101 and send said information to other apparatuses. For example, processor 101 controls the communication interface 104 at least in part.

By way of example, the input means 105 is configured to capture user inputs from a user and to forward them to the processor 101. By way of example, processor 101 is operatively connected to the input means 105. For example, processor 101 controls the input means 105 at least in part. It is assumed by way of example below that the input means 105 is a keypad, for example a numeric keypad or an alphanumeric keypad. Additionally or alternatively, the user apparatus 100 may also have other input means such as a mouse, a trackball, a joystick, a touchpad and/or a touch-sensitive screen.

By way of example, the display means 106 is configured to receive and display information from the processor 101. By way of example, processor 101 is operatively connected to the display means 106. For example, processor 101 controls the display means 106 at least in part. For example, the display means 106 is configured to display a graphical user interface of the user apparatus 100 (e.g. when the display means 106 is actuated as appropriate by the processor 101). It is assumed by way of example below that the display means 106 is a touch-sensitive screen. Additionally or alternatively, the user apparatus 100 may also have further display means.

By way of example, the positioning sensor 107 is used to capture the spatial and/or geographical position of the user apparatus 100. An example of such a positioning sensor is a sensor of a satellite-assisted positioning system such as a Global Positioning System sensor (GPS sensor), a GLO-NASS sensor and/or a Galileo sensor. By way of example, the positioning sensor 107 is configured to capture the position of the user apparatus 100 and to forward corresponding position information (e.g. a position statement and/or a coordinate statement for the captured position) to the processor 101.

It is assumed by way of example below that the user apparatus 100 is a mobile telephone. The invention is not limited thereto, however. Alternatively, the user apparatus may also be a PDA, a media player (e.g. an iPod), a navigation appliance (e.g. a navigation appliance for a vehicle, e.g. a permanently installed navigation appliance of a vehicle or a portable navigation appliance), a notebook computer and/or a tablet computer for example.

Figure 2:
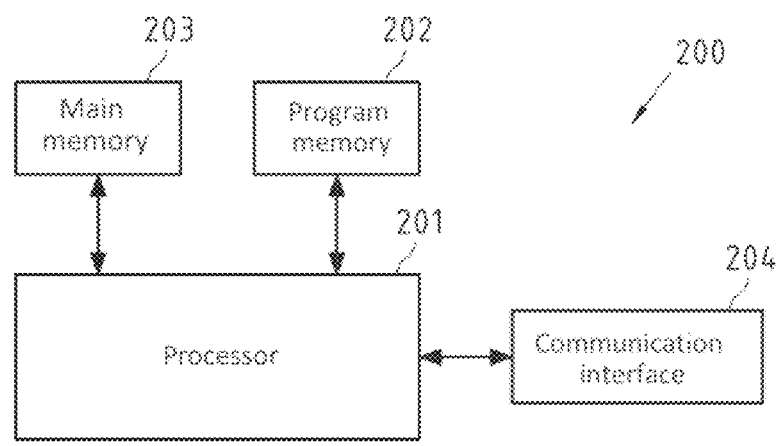
FIG. 2 shows a block diagram of the electronic components of an exemplary embodiment of a delivery service apparatus according to the invention.

FIG. 2 is a block diagram of an exemplary embodiment of the delivery service apparatus 200 according to the invention.

Processor 201 of the delivery service apparatus 200 is particularly in the form of a microcontroller or microprocessor. Processor 201 executes program instructions that are stored in program memory 202, and stores interim results or the like in main memory 203, for example. For example, program memory 202 is a nonvolatile memory such as a flash memory, a magnetic memory, an EEPROM memory, a persistent memory such as a ROM memory and/or an optical memory. Main memory 203 is a volatile or nonvolatile memory, for example, particularly a random access memory (RAM) such as a static RAM memory (SRAM), a dynamic RAM memory (DRAM), a ferroelectric RAM memory (FeRAM) and/or a magnetic RAM memory (MRAM).

Preferably, program memory 202 and main memory 203 are arranged together with processor 201 in one module.

Figure 6:
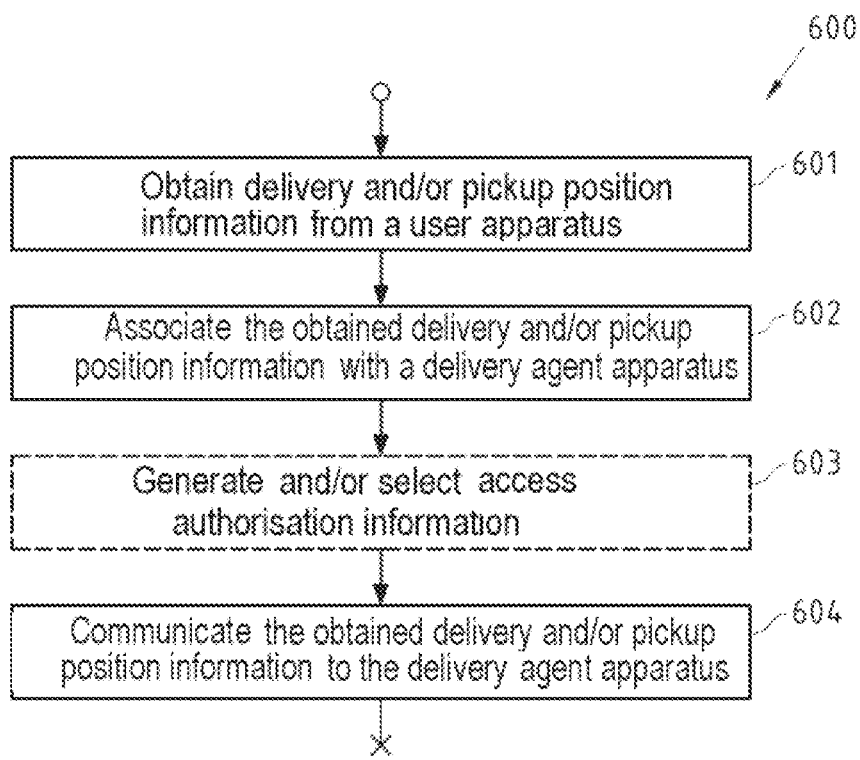
FIG. 6 shows a flowchart for an example of the second method according to the invention.

By way of example, program memory 202 stores program instructions that cause the processor 201, when it executes the program instructions, to perform and/or to control the method shown in FIG. 6 at least in part.

For example, the communication interface 204 is configured to communicate according to one or more wireless communication technologies. Alternatively or additionally, the communication interface 204 is configured, for example, to communicate according to one or more wired communication technologies. It is assumed by way of example below that the communication interface 204 supports communication via a mobile radio network. For example, the wireless communication interface 204 is formed at least in part by a transceiver for the mobile radio technology and one or more antennas. As disclosed above, an example of a mobile radio technology is GSM, UMTS and/or LTE.

By way of example, the processor 201 can communicate with other apparatuses such as a user apparatus (e.g. the user apparatus 100 in FIG. 3) via the communication interface 204. By way of example, processor 201 is operatively connected to the communication interface 204. By way of example, the communication interface 204 can receive or request information from other apparatuses and forward said information to processor 201 and/or can receive information from processor 201 and send said information to other apparatuses. For example, processor 201 controls the communication interface 204 at least in part.

Alternatively or additionally, the communication interface 204 may also be separate from the delivery service apparatus 200, for example.

It is assumed by way of example below that the delivery service apparatus 200 is a server of a delivery service.

Figure 3:
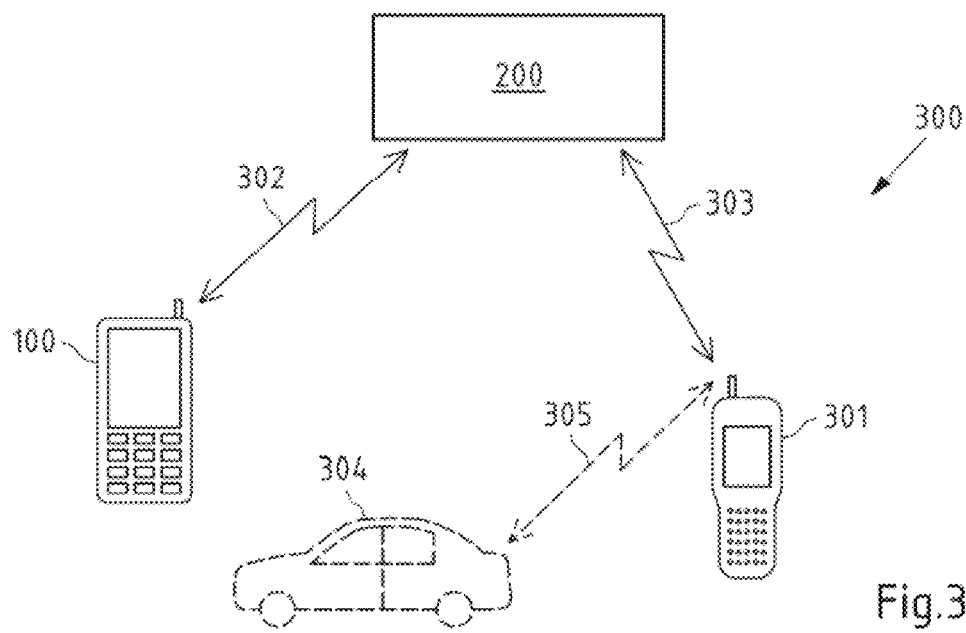
FIG. 3 shows a block diagram of an exemplary embodiment of a system according to the invention.

FIG. 3 shows an exemplary embodiment of a system 300 according to the invention. The system 300 comprises the user apparatus 100, the delivery service apparatus 200 and a portable delivery agent apparatus 301.

By way of example, the delivery agent apparatus 301 is an electronic appliance of the delivery agent from a delivery service who is charged with the delivery of the shipment into the vehicle. An example of the delivery agent apparatus 301 is, for example, a delivery agent appliance of a delivery service, such as a hand-held scanner, for example the Dolphin 99EX mobile computer from the company Honeywell.

The user apparatus 100 and the delivery service apparatus 200 are connected via the communication link 302 in system 300. For example, the communication interface 104 of the user apparatus 100 is configured to use communication link 302 to communicate with delivery service apparatus 200, for example to send information (e.g. delivery and pickup position information and/or delivery and pickup period information) to the delivery service apparatus 200 and/or to receive said information from the delivery service apparatus 200. In addition, the communication interface 204 of the delivery service apparatus 200 is configured to use communication link 302 to communicate with user apparatus 100, for example to send information to the user apparatus 100 and/or to receive said information from the user apparatus 100. It is assumed by way of example below that the communication link 302 comprises a wireless communication link via a mobile radio network.

The delivery service apparatus 200 and the delivery agent apparatus 301 are connected via the communication link 303 in system 300. For example, the communication interface 204 of the delivery service apparatus 200 is configured to use communication link 303 to communicate with delivery agent apparatus 301, for example to send information (e.g. delivery and pickup position information, delivery and pickup period information and/or access authorisation information) to the delivery agent apparatus 301 and/or to receive said information from the delivery agent apparatus 301. It is assumed by way of example below that the communication link 303 comprises a wireless communication link via a mobile radio network.

In addition, the system 300 optionally comprises the vehicle 304. The vehicle 304 in system 300 is an example of a mobile shipment holding apparatus. The invention is not limited thereto, however.

The vehicle 304 and the delivery agent apparatus 301 are optionally connected via the communication link 305 in system 300. For example, the delivery agent apparatus 301 can use the communication link 305 to send information (e.g. access authorisation information) to the vehicle 304 and/or to receive information from the vehicle 304. It is assumed by way of example below that the communication link 305 comprises a wireless communication link via a local radio network.

The communication links 302, 303 and 305 are shown in FIG. 3 as wireless communication links by way of example. However, it is also conceivable, by way of example, for the communication links 302, 303 and/or 305 not to be exclusively wireless communication links, for example at least one of the communication links 302, 303 and/or 305 comprises at least one wired communication link and at least one wireless communication link.

Figure 4:
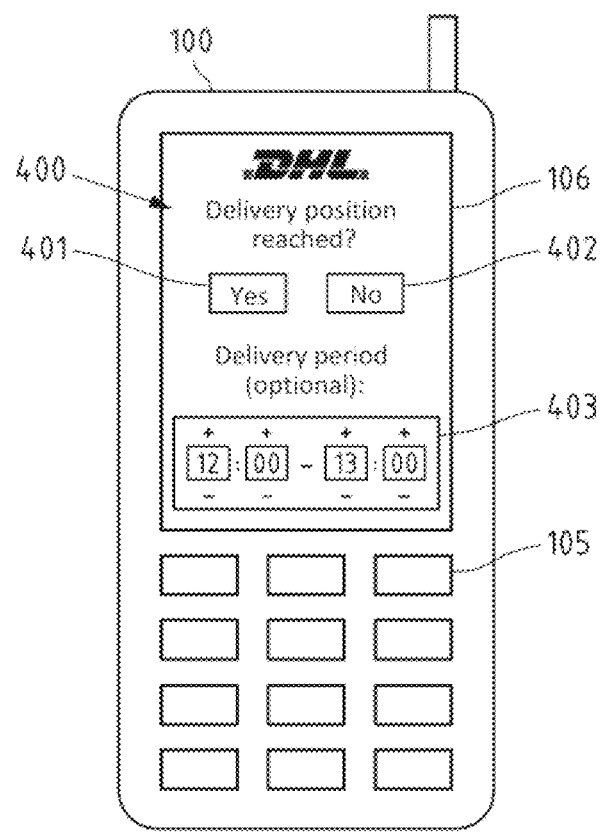
FIG. 4 shows a schematic illustration of an exemplary embodiment of a provided user interface of a graphical user interface of a user apparatus according to the invention.

FIG. 4 shows a schematic illustration of an exemplary embodiment of a provided user interface of a graphical user interface 400 of the user apparatus 100.

In the illustration of FIG. 4, the graphical user interface 400 is displayed on the display means 106 of the user apparatus 100. As disclosed above, it is assumed by way of example below that the display means 106 is a touch-sensitive screen.

The graphical user interface 400 comprises a key button 401 labelled "Yes" and a key button 402 labelled "No". The key buttons 401 and 402 are activable user interfaces that are activable by a user input such as a touch on the point of display on the display means 106 at which the respective key button 401 and 402 is displayed. The key button 401 is used to confirm that a delivery and/or pickup position has been reached, for example. For example, the display means 106 are configured to capture a touch on a point of display for the key button 401 or 402 and to forward appropriate information to the processor 101. For example, the processor 101 is configured to interpret the capturing of such a touch by the display means 106 as activation of the respective key button.

In addition, the user interface 400 comprises the optional selection element 403. The optional selection element 403 is used to select a start time and an end time for a delivery period by appropriate user input such as one or more touches on the display means 106 and/or one or more inputs on the input means 105. For example, the display means 106 and/or the input means 105 are configured to capture such user inputs and to forward appropriate information to the processor 101. For example, the processor 101 is configured to interpret the capturing of such user inputs by the display means 106 and/or the input means 105 as selection of a start time and an end time for a delivery period.

FIG. 5 shows a flowchart 500 for an example of the first method according to the invention. The steps shown in the flowchart 500 are performed and/or controlled by means in the user apparatus 100. By way of example, the steps are performed and/or controlled, at least in part, by the processor 101 of the user apparatus 100. For the explanation of the flowchart 500 below, reference is made by way of example to the system 300 and the graphical user interface 400.

In a step 501, an activable user interface for stipulating a delivery and/or pickup position is provided. Optionally, step 501 involves, by way of example, a further user interface for stipulating a delivery and/or pickup period being provided.

For example, step 501 involves the graphical user interface 400 with the key buttons 401 and 402 and the optional selection element 406 being displayed on the display means 106 of the user apparatus 100. For example, processor 101 of the user apparatus 100 actuates the display means 106 in order to accomplish the display of the graphical user interface 400 on the display means 106.

As disclosed above in relation to FIG. 4, the key buttons 401 and 402 are activable user interfaces that are activable by a user input such as a touch on the point of display on the display means 106 at which the respective key button 401 and 402 is displayed. For example, the display means 106 is configured to capture such a touch on a point of display and to forward appropriate information to the processor 101. For example, the processor 101 is configured to interpret the capturing of such a touch by the display means 106 as activation of the respective key area.

The optional selection element 403 is a further user interface that is used to select a start time and an end time for a delivery period by appropriate user input such as one or more touches on the display means 106 and/or one or more inputs on the input means 105. For example, the display means 106 and/or the input means 105 are configured to capture such user inputs and to forward appropriate information to the processor 101. For example, the processor 101 is configured to interpret the capturing of such user inputs by the display means 106 and/or the input means 105 as selection of a start time and an end time for a period.

In a step 502, a position of the user apparatus (e.g. the user apparatus 100) is captured when the user interface for stipulating a delivery and/or pickup position (e.g. the key button 401) is activated.

Step 502 is performed, by way of example, only when the user interface for stipulating a delivery and/or pickup position (e.g. the key button 401) is activated. In the example of the graphical user interface 400, step 502 is performed and the position of the user apparatus 100 is captured, by way of example, only when the key button 401 labelled "Yes" on the graphical user interface is activated, but not when the key button 402 labelled "No" is activated. The reason is that the user uses activation of the key button 401 to confirm that the delivery and/or pickup position has been reached.

For example, the position of the user apparatus 100 is captured in step 502 by the positioning sensor 107. For example, the processor 101 is configured to actuate the positioning sensor 107 in order to accomplish the capturing of the position of the user apparatus 100 by the positioning sensor 107 as soon as the user interface for stipulating a delivery and/or pickup position (e.g. the key button 401) has been activated.

For example, the user of the user apparatus 100 wants a shipment to be delivered into his vehicle 304 or picked up from his vehicle 304. For example, the shipment is meant to be delivered into the vehicle 304 or picked up therefrom so long as the vehicle 304 is situated at a particular position, for example is parked in a car park. In order to stipulate this position as a delivery and/or pickup position, the user can activate the key button 401, for example, as soon as he is situated at (or in proximity to) this position. For example, the user activates the key button 401 when he is situated in the parked vehicle 304 or immediately after he has alighted from the parked vehicle 304. Next, this position is captured in step 502.

In an optional step 503, delivery and/or pickup period information is obtained at the user apparatus (e.g. the user apparatus 100).

For example, the delivery and/or pickup period information is obtained in step 502 by the capturing of an input by a user on input means 105 and/or display means 106 of the user apparatus 100 (e.g. user inputs for selecting a start time and an end time for a period in the optional selection element 403).

In the example disclosed above, in which the user of the user apparatus 100 wants a shipment to be delivered into his vehicle 304 and/or picked up from his vehicle 304, the user can use selection element 403 to stipulate a delivery and/or pickup period in which the shipment can be delivered into the vehicle 304 or picked up therefrom at the position captured in step 502 (e.g. the delivery and/or pickup position). By way of example, the delivery and/or pickup period corresponds to the expected parking time of the vehicle 304 at the delivery and/or pickup position.

In a step 504, delivery and/or pickup position information associated with the position captured in step 502 is communicated to a delivery service apparatus (e.g. the delivery service apparatus 200). As an option for the delivery and/or pickup position information, step 504 can also involve delivery and/or pickup period information obtained in step 503 being communicated from the user apparatus (e.g. the user apparatus 100) to the delivery service apparatus (e.g. the delivery service apparatus 200), for example.

For example, the delivery and/or pickup position information comprises a position statement and/or coordinate statement for the position captured in step 502 (e.g. a parking position of the vehicle 304). In addition, the delivery and/or pickup position information comprises, by way of example, an identifier that can be associated with the delivery and/or pickup of the shipment, for example an identifier for a user of the user apparatus. For example, the user apparatus 100 lodges an identifier for the user of the user apparatus 100, for example stores it in program memory 102. For example, the user of the user apparatus 100 is registered with this identifier with the delivery service of the delivery service apparatus 200.

By way of example, the delivery and/or pickup period information corresponds to the delivery and/or pickup period information obtained in step 503. For example, the delivery and/or pickup period information indicates a start time and an end time for a period, at which delivery and/or pickup of a shipment at the position captured in step 502 (e.g. an expected parking period for the vehicle 304) is to be made.

The delivery and/or pickup position information (and optionally the delivery and/or pickup period information) is communicated, for example is sent by the communication interface 104, from the user apparatus 100 to the delivery service apparatus 200 in step 504, for example via the communication link 302.

FIG. 6 shows a flowchart 600 for an example of the second method according to the invention. The steps shown in the flowchart 600 are performed and/or controlled by means in the delivery service apparatus 200. By way of example, the steps are performed and/or controlled, at least in part, by the processor 201 of the delivery service apparatus 200. For the explanation of the flowchart 600 below, reference is made by way of example to the system 300 and the graphical user interface 400.

In a step 601, delivery and/or pickup position information is obtained at a delivery service apparatus (e.g. the delivery service apparatus 200) from a user apparatus (e.g. the user apparatus 100). Optionally, step 601 also involves delivery and/or pickup period information being obtained at the delivery service apparatus (e.g. the delivery service apparatus 200) from the user apparatus (e.g. the user apparatus 100).

For example, step 601 involves the delivery and/or pickup position information (and optionally the delivery and/or pickup period information) that was communicated from the user apparatus (e.g. the user apparatus 100) to the delivery service apparatus (e.g. the delivery service apparatus 200) in step 504 being obtained at the delivery service apparatus (e.g. the delivery service apparatus 200).

For example, the delivery and/or pickup position information (and optionally the delivery and/or pickup period information) is obtained, for example is received by the communication interface 204, from the user apparatus 100 at the delivery service apparatus 200 in step 601 via the communication link 302.

For example, the delivery and/or pickup position information comprises a position statement and/or coordinate statement for the position captured in step 502.

In addition, the delivery and/or pickup position information comprises, by way of example, an identifier that can be associated with the delivery and/or pickup of the shipment, for example an identifier for a user of the user apparatus 100. For example, the user of the user apparatus 100 is registered with this identifier with the delivery service of the delivery service apparatus 200 and/or with the delivery service apparatus 200. By way of example, the delivery and/or pickup period information corresponds to the delivery and/or pickup period information optionally obtained in step 502. For example, the delivery and/or pickup period information provides a start time and an end time for a period, at which delivery and/or pickup of a shipment at the position captured in step 502 (e.g. an expected parking period for the vehicle 304) is to be made.

In a step 602, the delivery and/or pickup position information obtained in step 601 is associated with a delivery agent apparatus (e.g. the delivery agent apparatus 301). Optionally, step 602 involves the delivery and/or pickup period information optionally obtained in step 601 likewise being associated with the delivery agent apparatus (e.g. the delivery agent apparatus 301).

The association is made on the basis of an identifier for the user of the user apparatus 100, for example, which identifier is contained in the delivery and/or pickup position information. For example, the user is registered with this identifier with the delivery service of the delivery service apparatus 200 and/or with the delivery service apparatus 200. For example, appropriate registration information is lodged in the delivery service apparatus 200, for example stored in program memory 202. In addition, delivery service apparatus 200 lodges information about which delivery agent of the delivery service is charged with delivery and/or pickup of a shipment (e.g. to or from the vehicle 304) of the user, for example. By way of example, the delivery and/or pickup position information obtained in step 601 (and optionally delivery and/or pickup period information obtained in step 601) is associated with the delivery agent apparatus (e.g. the delivery agent apparatus 301) of this delivery agent.

In an optional step 603, access authorisation information is selected and/or produced at least in part on the basis of the delivery and/or pickup position information obtained in step 601 and/or delivery and/or pickup period information obtained in step 601.

As disclosed above, the access authorisation information includes one or more access authorisation parameters, for example. This or these may be, by way of example, an (in particular explicit) identifier for an access authorisation checking apparatus (e.g. an access authorisation checking apparatus of a vehicle), an (in particular explicit) identifier for the access authorisation information itself, a temporal validity information, a spatial validity information, an upper limit for the permitted uses of the access authorisation information in order to gain access, and an information concerning the extent to which access can be granted (that is to say, by way of example, whether all doors of a vehicle can be opened, or just one or a particular group).

By way of example, the temporal validity information defines a delivery and/or pickup period in which the access authorisation information is valid and authorises access (e.g. to a vehicle). By way of example, the physical validity information defines a delivery and/or pickup position and/or a delivery and/or pickup area (e.g. a radius around a delivery and/or pickup position) in which the access authorisation information is valid and authorises access (e.g. to a vehicle).

The access authorisation information is produced and/or selected in step 602 for example such that the access authorisation information is valid at the delivery and/or pickup position associated with the delivery and/or pickup position information and/or within the delivery and/or pickup period associated with the delivery and/or pickup period information. For example, the access authorisation information can be selected from multiple access authorisation information lodged in the delivery service apparatus 200 (e.g. stored in program memory 202). Alternatively or additionally, the access authorisation information can be produced by a computation according to a computation rule lodged in the delivery service apparatus 200 (e.g. stored in program memory 202), for example.

For example, the access authorisation information authorises access to the vehicle 304 for delivery and/or pickup of a shipment at the delivery and/or pickup position associated with the delivery and/or pickup position information and within the delivery and/or pickup period associated with the delivery and/or pickup period information. For example, the access authorisation information can be used by delivery agent apparatus 301 and sent to vehicle 304, for example via communication link 305, in order to allow a delivery agent access to the vehicle 304.

In a step 604, the delivery and/or pickup position information obtained in step 601 is communicated from the delivery service apparatus (e.g. the delivery service apparatus 200) to the delivery agent apparatus (e.g. the delivery agent apparatus 301) with which the delivery and/or pickup position information was associated in step 602. Optionally, step 604 also involves the delivery and/or pickup period information optionally obtained in step 601 and/or the access authorisation information produced and/or selected in step 603 being communicated from the delivery service apparatus (e.g. the delivery service apparatus 200) to this delivery agent apparatus (e.g. the delivery agent apparatus 301).

The delivery and/or pickup position information (and optionally the delivery and/or pickup period information and/or the access authorisation information) is communicated, for example is sent by the communication interface 204, from the delivery service apparatus 200 to the delivery agent apparatus 301 in step 604, for example via communication link 303.

The exemplary embodiments of the present invention that are described in this specification are also intended to be understood as disclosed in all combinations with one another. In particular, the description of a feature that an embodiment comprises is—unless explicitly explained to the contrary—also not intended to be understood, in the present case, to mean that the feature is indispensable or essential for the function of the exemplary embodiment. The sequence of the method steps outlined in this specification in the individual flowcharts is not imperative, and alternative sequences of the method steps are conceivable. The method steps can be implemented in different ways, and implementation in software (by virtue of program instructions), hardware or a combination of the two is conceivable for implementing the method steps.

Terms used in the patent claims such as "comprise", "have", "contain", "include" and the like do not exclude further elements or steps. The wording "at least in part" covers both the "in part" case and the "completely" case. The wording "and/or" is intended to be understood to mean that both the alternative and the combination are intended to be disclosed, that is to say that "A and/or B" means "(A) or (B) or (A and B)". Within the context of this specification, a plurality of units, persons or the like means multiple units, persons or the like. The use of the indefinite article does not exclude a plurality. A single device can carry out the functions of multiple units or devices cited in the patent claims. Reference symbols specified in the patent claims are not intended to be regarded as limitations for the means and steps employed.

The invention claimed is:

1. A method, performed by a portable user apparatus, the portable user apparatus comprising a processor operatively connected to program memory, a wireless communication interface, an touchscreen, and a positioning sensor, the method comprising
   executing, by the processor, an application stored on the program memory, the application displaying an activable user interface on the touchscreen for stipulating a delivery and/or pickup position, wherein the activable user interface is an activable element of a graphical user interface, the activable user interface comprising a button and is activable by a single user input through the touchscreen,
   capturing the single user input at a point on the touchscreen corresponding to the button of the graphical user interface,
   capturing a position of the user apparatus when the user interface is activated, wherein the capturing is performed by the positioning sensor of the user apparatus, and wherein the position of the user apparatus is captured during the activation of the activable user interface,
   displaying on the touchscreen a further graphical user interface for stipulating a delivery and/or pickup period,
   obtaining delivery and/or pickup period information by the further graphical user interface based on input through the touchscreen,
   communicating over the wireless communication interface an identifier of a user of the portable user apparatus along with delivery and/or pickup position information associated with the captured position and the obtained delivery and/or pickup period information from the user apparatus to a delivery service apparatus, the identifier being registered with the delivery service apparatus and associated with access authorization information to effectuate delivery and/or pickup of a shipment into a vehicle.

2. The method according to claim 1, further comprising:
   obtaining the delivery and/or pickup position information from the user apparatus at the delivery service apparatus,
   associating, by the delivery service apparatus, the obtained delivery and/or pickup position information with a delivery agent apparatus,
   obtaining the delivery and/or pickup period information from the user apparatus at the delivery service apparatus,
   communicating the obtained delivery and/or pickup position information and the obtained delivery and/or pickup period information from the delivery service apparatus to the delivery agent apparatus.

3. A portable user apparatus comprising at least one processor, at least one memory that contains program code, a wireless communication interface, a touchscreen, and a positioning sensor, wherein the memory and the program code with the at least one processor are configured to cause the user apparatus to perform:
   executing, by the at least one processor, an application stored on the at least one memory, the application displaying an activable user interface on the touchscreen for stipulating a delivery and/or pickup position, wherein the activable user interface is an activable element of a graphical user interface, the activable user interface comprising a button and is activable by a single user input through the touchscreen, capturing the single user input on the touchscreen corresponding to the button of the graphical user interface, capturing a position of the user apparatus when the user interface is activated, wherein the capturing is performed by the positioning sensor of the user apparatus and wherein the position of the user apparatus is captured during the activation of the activable user interface, displaying on the touchscreen a further graphical user interface for stipulating a delivery and/or pickup period, obtaining delivery and/or pickup period information by the further graphical user interface based on input through the touchscreen, communicating over the wireless communication interface an identifier of a user of the portable user apparatus along with delivery and/or pickup position information associated with the captured position and the obtained delivery and/or pickup period information from the user apparatus to a delivery service apparatus, the identifier being registered with the delivery service apparatus and associated with access authorization information to effectuate delivery and/or pickup of a shipment into a vehicle.

4. A non-transitory computer-readable medium having stored thereon a computer program for a portable user apparatus that, when the computer program runs on a processor of the user apparatus, causes the processor to control:

executing, by the processor of the user apparatus, an application stored on the non-transitory computer-readable medium, the application causing displaying of an activable user interface on a touchscreen of the user apparatus for stipulating a delivery and/or pickup position, wherein the activable user interface is an activable element of a graphical user interface, the activable user interface comprising a button and is activable by a single input through the touchscreen of the user apparatus, capturing the single user input at a point on the touchscreen corresponding to the button of the graphical user interface, capturing a position of the user apparatus when the user interface is activated, wherein the capturing is performed by a positioning sensor of the user apparatus and wherein the position of the user apparatus is captured during the activation of the activable user interface, displaying on the touchscreen a further graphical user interface for stipulating a delivery and/or pickup period, obtaining delivery and/or pickup period information by the further graphical user interface based on input through the touchscreen, communicating over a wireless communication interface of the user apparatus an identifier of a user of the user apparatus along with delivery and/or pickup position information associated with the captured position and the obtained delivery and/or pickup period information from the user apparatus to a delivery service apparatus, the identifier being registered with the delivery service apparatus and associated with access authorization information to effectuate delivery and/or pickup of a shipment into a vehicle.

5. A system comprising:

a portable user apparatus comprising at least one processor, at least one memory that contains program code, a wireless communication interface, a touchscreen, and a positioning sensor, wherein the memory and the program code with the at least one processor are configured to cause the user apparatus to perform:

executing, by the processor, an application stored on the at least one memory, the application displaying an activable user interface on the touchscreen for stipulating a delivery and/or pickup position, wherein the activable user interface is an activable element of a graphical user interface, the activable user interface comprising a button and is activable by a single user input through the touchscreen, capturing the single user input at a point on the touchscreen corresponding to the button of the graphical user interface, capturing a position of the user apparatus when the user interface is activated, wherein the capturing is performed by the positioning sensor of the user apparatus and wherein the position of the user apparatus is captured during the activation of the activable user interface, displaying on the touchscreen a further graphical user interface for stipulating a delivery and/or pickup period, obtaining delivery and/or pickup period information by the further graphical user interface based on input through the touchscreen, communicating over the wireless communication interface an identifier of a user of the portable user apparatus along with delivery and/or pickup position information associated with the captured position and the obtained delivery and/or pickup period information from the user apparatus to a delivery service apparatus, the identifier being registered with the delivery service apparatus and associated with access authorization information to effectuate delivery and/or pickup of a shipment into a vehicle;

a delivery service apparatus comprising at least one processor and at least one memory that contains program code, wherein the memory and the program code with the at least one processor are configured to cause the delivery service apparatus to perform:

obtaining delivery and/or pickup position information from a portable user apparatus at a delivery service apparatus, associating, by the delivery service apparatus, the obtained delivery and/or pickup position information with a delivery agent apparatus, obtaining delivery and/or pickup period information from the user apparatus at the delivery service apparatus, communicating the obtained delivery and/or pickup position information and the obtained delivery and/or pickup period information from the delivery service apparatus to the delivery agent apparatus.

* * * * *